(12) United States Patent
Ong

(10) Patent No.: US 7,857,297 B2
(45) Date of Patent: Dec. 28, 2010

(54) ELECTRODYNAMIC PROPULSION SYSTEM FOR CONVEYING SHEET MATERIAL

(75) Inventor: Henson C. Ong, Waterbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 445 days.

(21) Appl. No.: 11/948,229

(22) Filed: Nov. 30, 2007

(65) Prior Publication Data

US 2009/0139839 A1 Jun. 4, 2009

(51) Int. Cl.
*B65H 29/00* (2006.01)
(52) U.S. Cl. ................ 270/52.16; 270/52.14; 271/193; 271/271; 198/619; 198/805; 414/19
(58) Field of Classification Search .............. 270/52.14, 270/52.16, 52.18, 52.19, 52.26, 52.29, 58.29; 271/193, 271; 198/617, 619, 690.1, 805; 414/18, 19, 749.2
See application file for complete search history.

(56) References Cited

U.S. PATENT DOCUMENTS 5,067,697 A * 11/1991 Honegger .................... 270/37
5,180,048 A * 1/1993 Kawada et al. .............. 198/619
7,134,258 B2 * 11/2006 Kalany et al. .................. 53/473
7,588,239 B2 * 9/2009 Marcinik et al. ......... 270/52.18
2003/0136086 A1 * 7/2003 Kalany et al. ................. 53/443
2007/0132178 A1 * 6/2007 Marcinik et al. ............ 271/226
2008/0265483 A1 * 10/2008 Herrmann ................ 270/58.08

* cited by examiner

*Primary Examiner*—Leslie A Nicholson, III
(74) *Attorney, Agent, or Firm*—Brian A. Collins; Angelo N. Chaclas

(57) ABSTRACT

A transport system for conveying sheet material along a feed path. The transport system includes an electro-dynamic propulsion system for moving sheet material, or a stacked collation of sheet material, along a support deck which defines the feed path. More specifically, the electro-dynamic propulsion system includes at least one guideway and a ferromagnetic element disposed internally of the guideway. The guideway includes a magnetic coil to produce a variable magnetic field. By varying the flux density and polarity of the magnetic field the ferromagnetic element may be propelled within the guideway. An abutment member is coupled to the ferromagnetic element, extends through the elongate opening of the support deck and engages an edge of sheet material. A processor is operative to control the electro-dynamic propulsion system and, accordingly, the rate of travel and position of the sheet material along the feed path.

7 Claims, 6 Drawing Sheets

ELECTRODYNAMIC PROPULSION SYSTEM FOR CONVEYING SHEET MATERIAL

FIELD OF THE INVENTION

The present invention relates to apparatus for conveying sheet material and, more particularly, to an apparatus for transport and/or alignment of sheet material, multi-sheet collations and other media items.

BACKGROUND OF THE INVENTION

Various apparatus are employed for arranging sheet material in a package suitable for use or sale in commerce. One such apparatus, useful for describing the teachings of the present invention, is a mailpiece inserter system employed in the fabrication of high volume mail communications, e.g., mass mailings. Such mailpiece inserter systems are typically used by organizations such as banks, insurance companies and utility companies for producing a large volume of specific mail communications where the contents of each mailpiece are directed to a particular addressee. Also, other organizations, such as direct mailers, use mail inserters for producing mass mailings where the contents of each mailpiece are substantially identical with respect to each addressee. Examples of inserter systems are the 8 series, 9 series, and APS™ inserter systems available from Pitney Bowes Inc. located in Stamford, Conn., USA.

In many respects, a typical inserter system resembles a manufacturing assembly line. Sheets and other raw materials (i.e., a web of paper stock, enclosures, and envelopes) enter the inserter system as inputs. Various modules or workstations in the inserter system work cooperatively to process the sheets until a finished mailpiece is produced. The precise configuration of each inserter system depends upon the needs of each customer or installation.

Typically, inserter systems prepare mailpieces by arranging preprinted sheets of material into a collation, i.e., the content material of the mailpiece, on a transport deck. The collation of preprinted sheet may continue to a chassis module where additional sheets or inserts may be added to a targeted audience of mailpiece recipients. From the chassis module, the fully developed collation may continue to a stitcher module where the sheet material may be stitched, stapled, or otherwise bound. Subsequently, the bound collation is typically folded and placed into envelopes. Once filled, the envelopes are conveyed to yet other stations for further processing. That is, the envelopes may be closed, sealed, weighed, sorted and stacked. Additionally, the inserter may include a postage meter for applying postage indicia based upon the weight and/or size of the mailpiece.

The mailpiece collation may comprise several individualized documents, i.e., specific to a mailpiece addressee, and/or one or more preprinted inserts which may be specifically tailored to the addressee. Generally, a barcode system is employed to command various sheet feeding mechanisms (i.e., one of the components of the chassis module mentioned in the preceding paragraph) to feed/add a particular insert to a collation. Of course, the mailpiece collation may comprise any combination of sheet material, whether they include personalized documents, preprinted inserts or a combination thereof.

FIGS. 1a-1c show the relevant components of a prior art chassis module/station 100 of an inserter system. The figures show the chassis module 100 conveying a sheet material 112 along a transport deck 114 (omitted from FIG. 1a to reveal underlying components). The transport deck 114 includes a drive mechanism 116 for displacing the sheet material 112 as it slides over the transport deck 114. In FIG. 1c, the transport deck 114 includes a low friction surface 114S having a pair of parallel grooves or slots 114G formed therein. Riding in the grooves or through the slots 114G are fingers 116F which extend orthogonally from the surface 114S of the deck 114.

Referring to FIGS. 1a-1c, the fingers 116F are driven by a belt or chain $118_{C1}$, which in turn wraps around a drive sprocket or gear 118G. Furthermore, the fingers $116F_1$ are spaced in equal length increments while the fingers $116F_2$, of adjacent chains $118_{C1}$, $118_{C2}$ are substantially aligned, i.e., laterally across the transport deck 114. As such, a substantially rectangular region or pocket is established between the fingers $116F_1$, $116F_2$.

Above the transport deck 114 are one or more feeder mechanisms 120A, 120B (two are shown for illustration purposes) which are capable of feeding inserts 122, i.e., sheet material, to the transport deck 114. The inserts 122 may be laid to build a collation 112 or may be added to the sheet material 112 (i.e., a partial collation) initiated upstream of the transport deck 114. A controller (not shown) issues command signals to the feeder mechanisms 120A, 120B to appropriately time the feed sequence such that the inserts 122 are laid in the rectangular region 124 between the fingers $116F_1$, $116F_2$. More specifically, as each pair of lateral fingers $116F_1$, $116F_2$ is driven within the grooves or slots 144G, one edge of the sheet material 112 is engaged to slide the collation 112 along the transport deck 114. As the sheet material 112 passes below the feeding mechanisms 120A, 120B, other sheets or inserts 122 are added. At the end of the transport deck 114, the fingers $116F_1$, $116F_2$ drop beneath the transport deck 114 such that the collation (i.e., the combination of the sheet material and inserts 122) may proceed to subsequent processing stations.

While the drive mechanism 116 of the prior art provides rapid transport of collated sheet material 112, 122 and has proven to be effective and reliable, sheets or inserts 122 fed by the feeding mechanisms 120A, 120B can become misaligned in the rectangular space or pocket 124 provided between the fingers $116F_1$, $116F_2$. That is, inasmuch as the pocket 124 is oversized to accept the sheets or inserts 122, the inserts 122 can become misaligned due to a lack of positive registration surfaces on all sides of the collation 112, 122.

Various mechanisms are employed to vary the pocket size, i.e., sometimes referred to as the "pitch", between the chassis fingers. The ability to change pitch not only enables greater efficiency, i.e., a greater number of pockets for inserts, but also minimizes the misalignment of inserts being laid on a collation. Notwithstanding the ability to minimize pocket size, it will be appreciated that without positive restraint on all free edges of the collation, individual sheets or inserts will be misaligned. Consequently, prior art inserters commonly employ complex registration mechanisms or jogging devices to align the free edges of a collation. For example, inserters may employ a series of swing arms which pivot onto the transport deck, i.e., into the conveyance path of the collation. The swing arms engage and align the leading edge of a collation, i.e., the edge opposite the fingers. While the swing arms effectively maintain alignment of the collation, the mechanical complexity associated with the pivoting mechanism is a regular source of maintenance, jamming or failure.

In the absence of such swing arms, an inserter may employ other jogging mechanisms downstream of the chassis module to align the edges of the collation. That is, before subsequent processing, e.g., stitching or enveloping, the edges of the collation are aligned to: (i) ensure that stitching does not result in permanent misalignment of the collation or (ii) provide a smooth transition and/or snug fit within a mailing envelope. Such jogging mechanisms often employ a complex arrangement of solenoid activated stops which tap or "jog" each edge by a predetermined displacement with each motion of the stop. By jogging the stops several times, the edges of the collation are aligned. Like the swing arm mechanisms described above, the jogging mechanisms are highly complex and prone to increased maintenance, jamming and failure.

A need, therefore, exists for a transport system for sheet material which eliminates mechanical complexity, enhances reliability and minimizes maintenance.

SUMMARY OF THE INVENTION

A transport system is provided for conveying sheet material along a feed path. The transport system includes an electro-dynamic propulsion system for moving sheet material, or a stacked collation of sheet material, along a support deck which defines the feed path. More specifically, the electro-dynamic propulsion system includes at least one guideway and a ferromagnetic element disposed internally of the guideway. The guideway includes a magnetic coil to produce a variable magnetic field. By varying the flux density and polarity of the magnetic field, the ferromagnetic element may be propelled within the guideway. An abutment member is coupled to the ferromagnetic element, extends through the elongate opening of the support deck and engages an edge of sheet material. A processor is operative to control the electro-dynamic propulsion system and, accordingly, the rate of travel and position of the sheet material along the feed path.

BRIEF DESCRIPTION OF THE DRAWINGS

Further details of the present invention are provided in the accompanying drawings, detailed description, and claims.

DETAILED DESCRIPTION

The present invention will be described in the context of a mailpiece inserter for processing mail communications. It should be appreciated, however, that the inventive transport system is broadly applicable to any apparatus/system which conveys sheet material, or a collation of stacked sheets, along a feed path. In the context used herein, "sheet material" means any sheet, page, document, or media wherein the dimensions and stiffness properties in one dimension are a small fraction, e.g., 1/100th, of the dimensions and stiffness characteristics of the other dimensions. As such, the sheet material is substantially "flat" and flexible about axes parallel to the plane of the sheet. In addition to individual sheets of paper, plastic or fabric, objects such as envelopes and folders may also be considered "sheet material" within the meaning provided herein. Furthermore, the terms "sheet", "sheet material", "media item", and "content material" (i.e., when referring to sheets to be inserted within a mailpiece envelope) may be used interchangeably herein.

In the broadest sense of the invention, a transport system is provided which employs an Electro-Dynamic Propulsion (EDP) system to provide the motive force for conveying a sheet of material, or a stacked collation of sheet material. The EDP system develops a magnetic field which propels and/or positions ferromagnetic elements within an elongate channel therein. The ferromagnetic elements are coupled to abutment members or fingers which engage an edge of the sheet material through openings formed in a support deck. A processor controls the motion/position of the ferromagnetic elements to transport the sheet material along a feed path defined by the support deck.

Figure 1A:
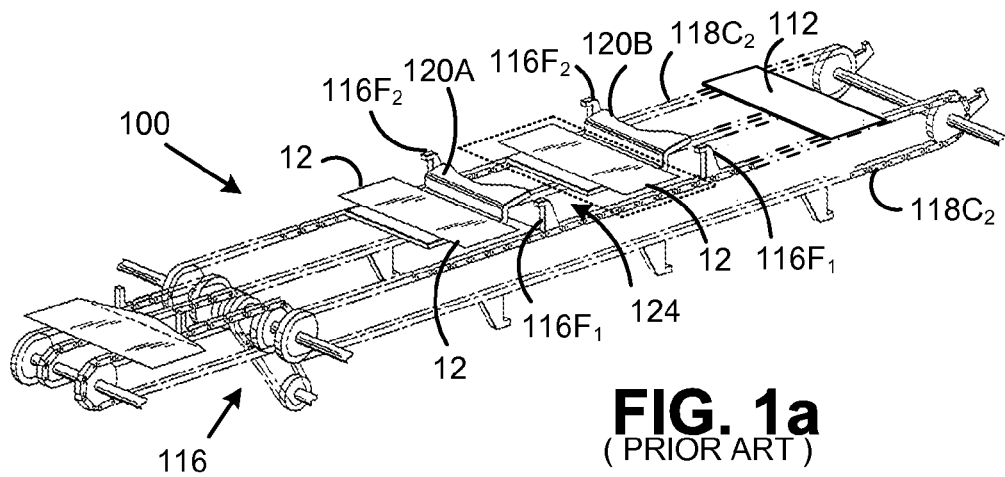
FIG. 1a is a perspective view of a prior art chassis drive mechanism employed in a mailpiece inserter system.
Figure 1B:
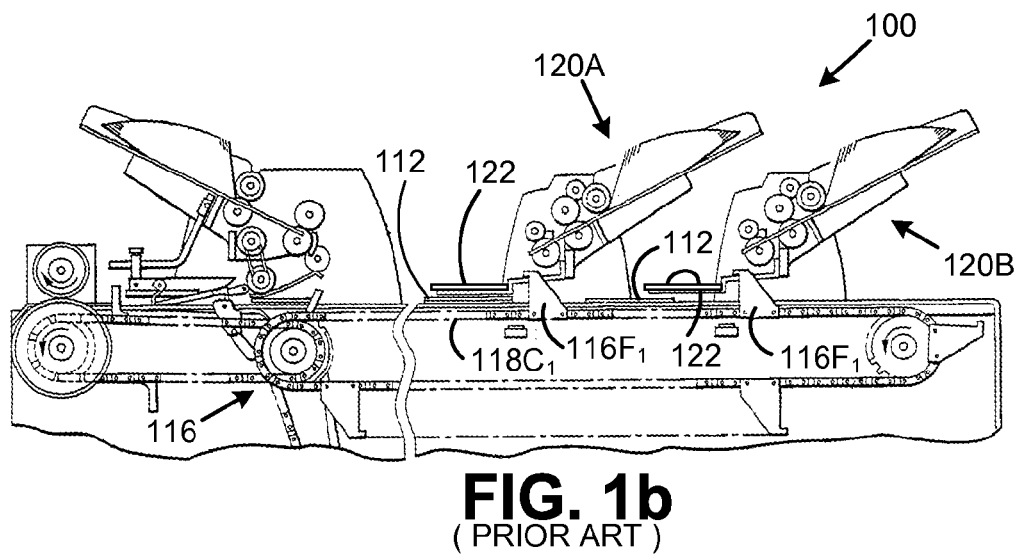
FIG. 1b is a profile view of the prior art chassis drive mechanism shown in FIG. 1a including feed mechanisms for building a sheet material collation.
Figure 1C:
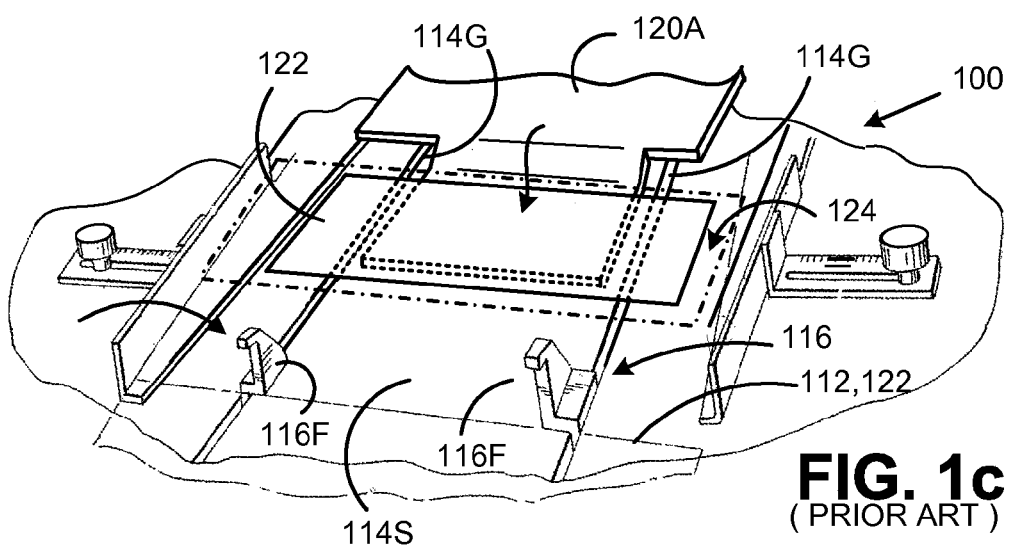
FIG. 1c is a broken-away, isometric view of the prior art chassis drive mechanism of FIG. 1a to more clearly show chain driven fingers for conveying the sheet material collation along a transport deck.
Figure 2:
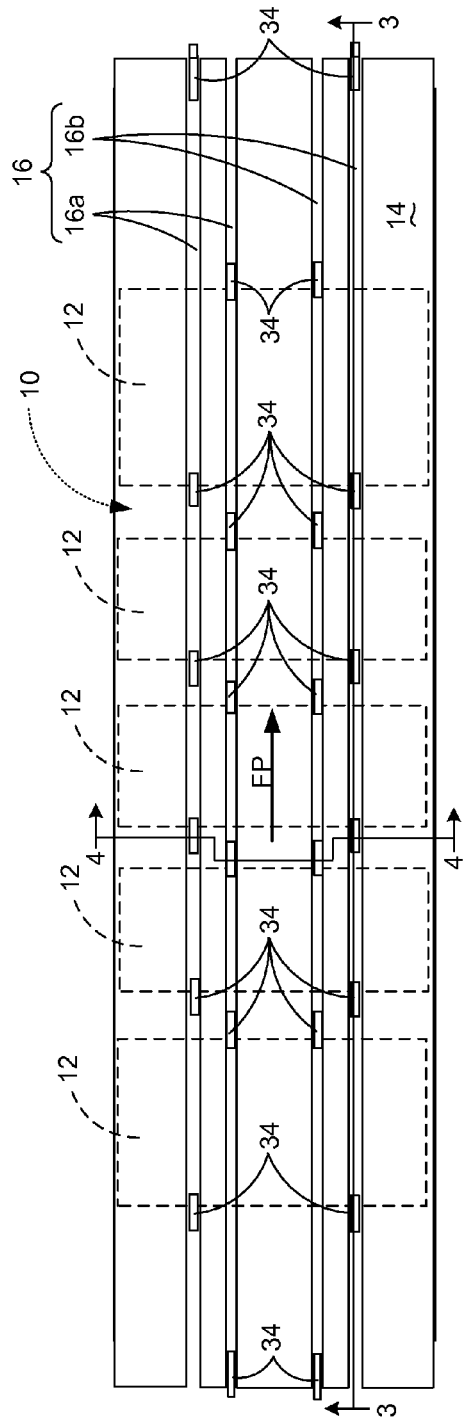
FIG. 2 is a top view of a transport system according to the present invention including an Electro-Dynamic Propulsion (EDP) system magnetic for propelling a ferromagnetic element within a guideway and an abutment member coupled to the ferromagnetic element for engaging and conveying sheet material along a support deck.
Figure 3:
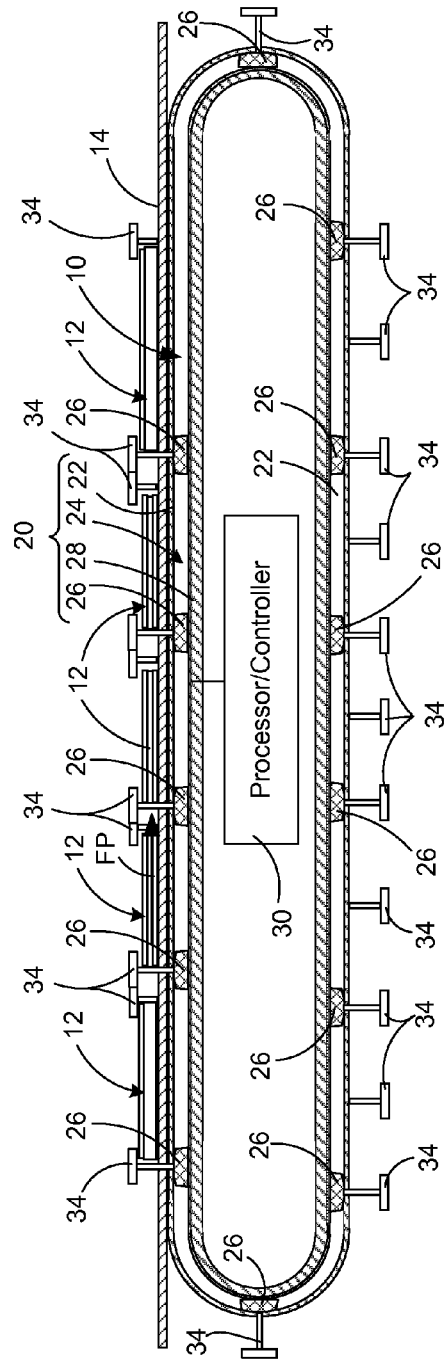
FIG. 3 is a cross-sectional view taken substantially along line 3-3 of FIG. 2.
Figure 4:
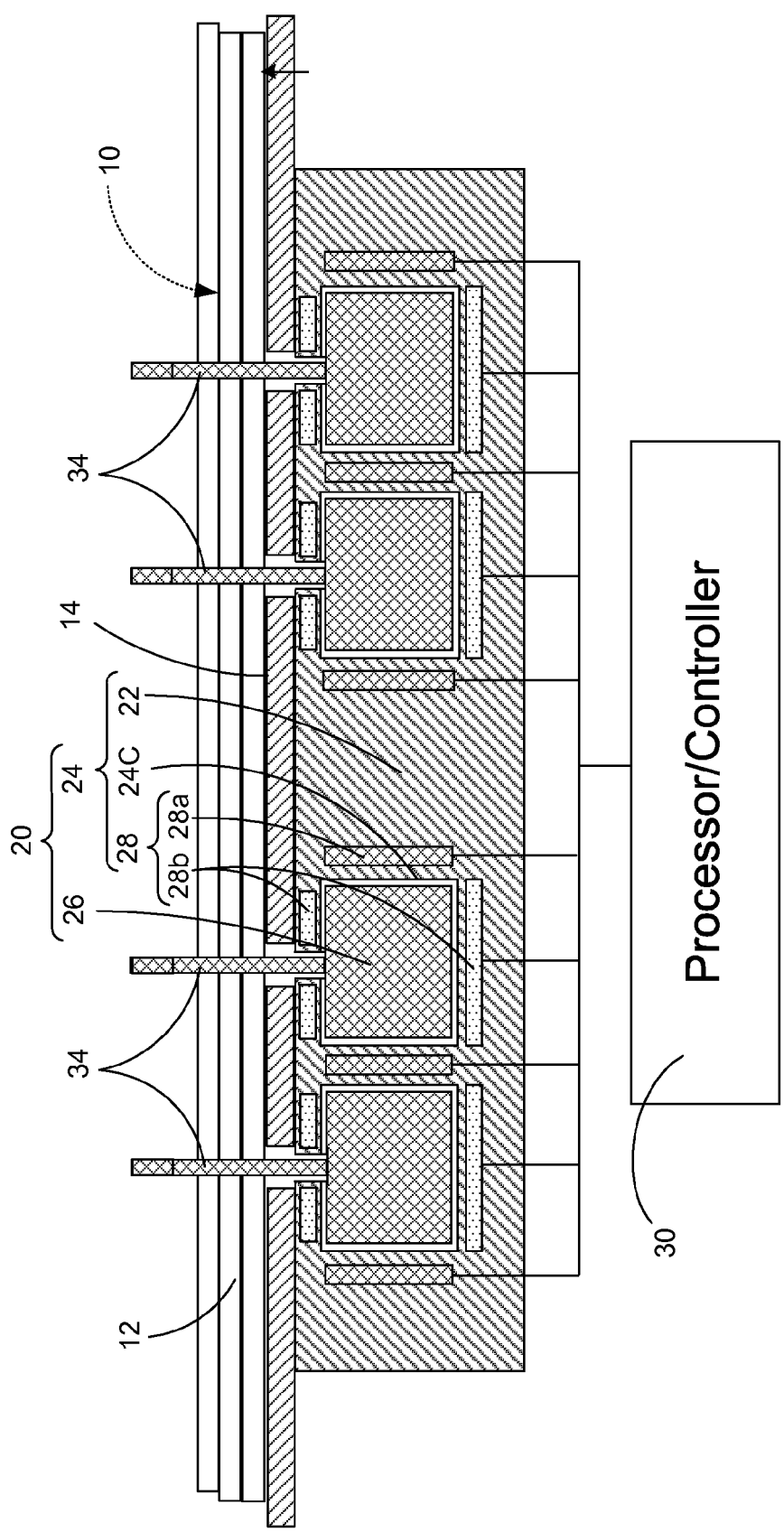
FIG. 4 is a cross-sectional view taken substantially along line 4-4 of FIG. 2.

In FIGS. 2, 3 and 4, an exemplary embodiment of a transport system 10 according to the present invention is shown. The transport system 10 is operative to convey sheet material, or stacks of sheet material 12, along a support deck 14 which defines a feed path FP. The support deck 14 includes one or more elongate openings or slots 16 which are generally parallel to each other and/or parallel to the feed path FP. Further, the elongate slots 16 essentially extend the entire length of the feed path, or the travel length along the support deck 14. In the described embodiment, the support deck 14 includes two (2) closely-spaced pairs of elongate slots 16a, 16b (discussed in greater detail below) which (i) produce variable size pockets for conveying sheet material 12, (ii) jog the edges of sheet material to register the sheets of a stacked collation, and (iii) correct the orientation of sheets and/or stacked collations 12 which have been become misaligned during transport.

An Electro-Dynamic Propulsion (EDP) system 20 is located adjacent, e.g., beneath, the support deck 14 and includes an assembly housing 22 which collectively supports the various EDP system elements. More specifically, the EDP system 20 includes one or more guideways 24 each having one or more ferromagnetic elements 26 disposed therein. In the described embodiment, a guideway 24 is disposed beneath, and corresponds to, each of the elongate slots 16, i.e., a guideway 24 is formed beneath each of the elongate slots 16. Furthermore, each guideway 24 contains a plurality of ferromagnetic elements 26 which are longitudinally spaced-apart along the length of the guideway 24.

Moreover, each guideway 24 includes a guideway channel 24C and a magnetic coil 28 surrounding, e.g., imbedded within, the sidewalls 24S of the channel 24C. The magnetic coil 28 includes a propulsive coil 28a disposed along each side of the guideway channel 24 and a suspension coil 28b disposed along the top and bottom of the guideway channel 24. While the magnetic coil 28 may be configured in a variety of ways, the coil 28 generally includes plurality of windings capable of generating a controllable magnetic field which produces multiple polar regions. That is, the windings are configured, i.e., wound in a continuous series of loops, to produce a combination of steady and alternating polar regions which may be varied in intensity and direction. A processor 30 controls the magnitude and polarity of the magnetic field such that a flowing wave, e.g., sinusoidal wave, of polar crests and troughs are produced within and around the ferromagnetic elements 26.

Figure 5:
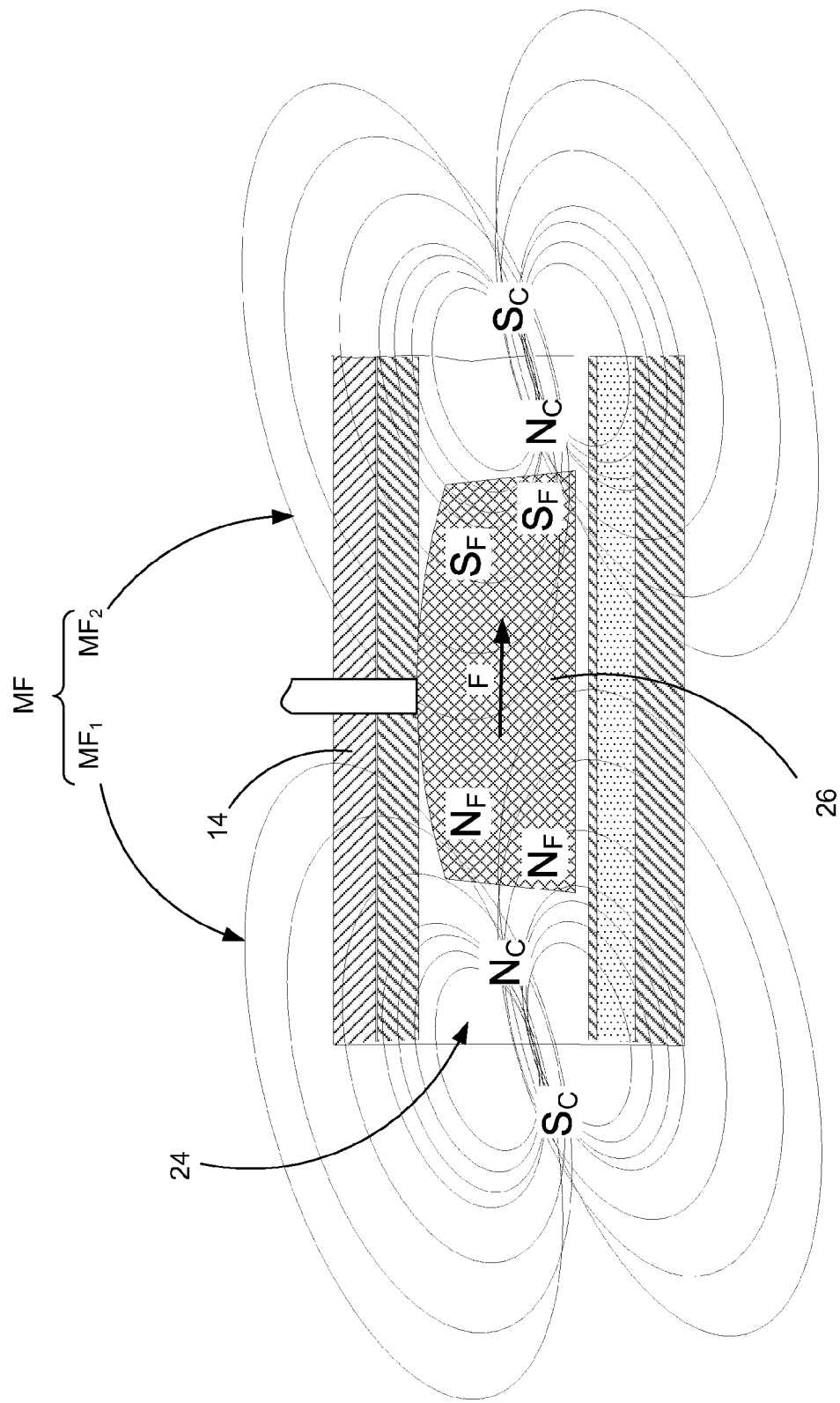
FIG. 5 depicts a schematic view of the magnetic field produced within the guideway and its interaction with a ferromagnetic element of the EDP system
Figure 6:
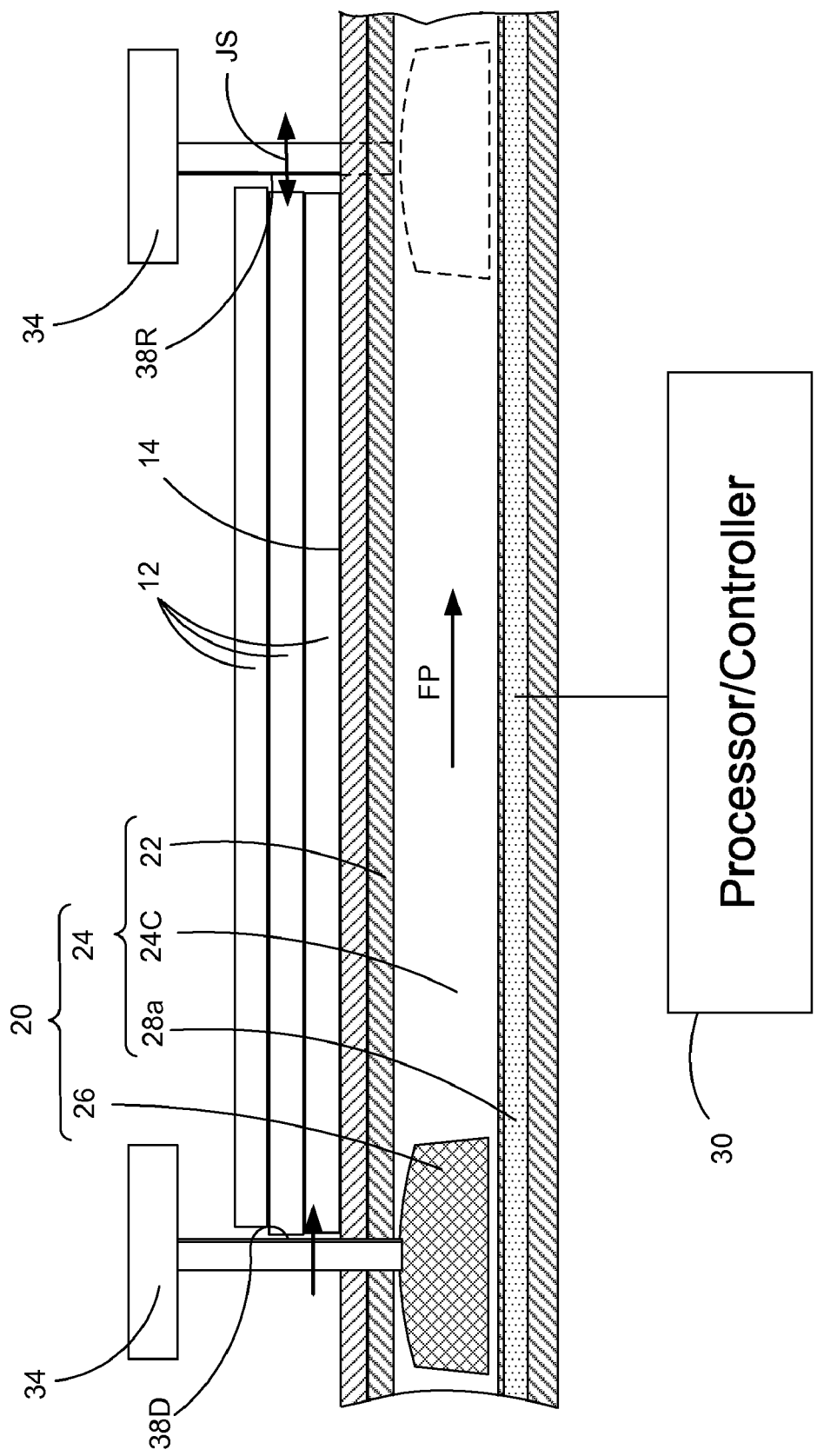
FIG. 6 is an enlarged, broken-away, side sectional view depicting a ferromagnetic element being suspended and propelled within a guideway of the EDP system.

In FIGS. 4, 5 and 6, each ferromagnetic element 26 is fabricated to form a permanent magnet, i.e., a magnet having a prescribed molecular alignment. The poles $N_F$, $S_F$ (see FIG. 5) of each ferromagnetic element 26 are responsive to, or interact with, the magnetic field MF of the propulsive coils 28a such that each element 26 IS propelled within the guideway 24. The processor 30 causes the magnetic field MF of the propulsive coil 28a to develop north and south polar regions $N_G$, $S_G$ at various locations with respect to each ferromagnetic element 26. At one location, e.g., aft of the ferromagnetic element 26, a first magnetic field $MF_1$ may be produced such that the north pole $N_G$ leads the south pole $S_G$, i.e., from left to right, in FIG. 5. At another location, e.g., forward of the ferromagnetic element 26, a second magnetic field $MF_2$ may be produced such that the north $N_G$ trails the south pole $S_G$. The polar north $N_G$ of the first magnetic field $MF_1$ causes the north pole $N_F$ of the ferromagnetic element 26 to be repelled from left to right, in FIG. 5, i.e., in the direction of arrow F. Further, the polar north $N_G$ of the second magnetic field $MF_2$ causes the south pole $S_F$ of the ferromagnetic element 26 to be attracted or pulled from left to right, thereby augmenting the propulsive forces F applied to the ferromagnetic element 26.

From the foregoing, it will be appreciated that the position and rate of travel of the ferromagnetic elements 26 along the feed path FP is dependant upon the control of the coils 28a, 28b. That is, the position and speed of the ferromagnetic elements 26 is dependant upon the location and rate of change of the magnetic fields $MF_1$, $MF_2$, i.e., the rate that the magnetic fields $MF_1$, $MF_2$ are shifted in toward or away from each ferromagnetic element 26. Accordingly, the longitudinal position of the ferromagnetic elements 26, the relative position of the elements 26 within the same guideway (i.e., the spacing between ferromagnetic elements 26), the position of one element 26 in a first guideway 24 relative to the position of another element 26 in an adjacent or second guideway 24, and the rate of travel may be precisely controlled.

Inasmuch as the control of an electro-dynamic suspension system (conventionally associated with the levitation and locomotion of large/heavy objects such as passenger trains or carting systems) is well-known in the art, further detailed description of the control algorithms is omitted to facilitate the description. That is, a description of the program logic/code to move or position a ferromagnetic element within a guideway is not necessary to appreciate or practice the teachings of the present invention. In fact, the diminished scale and size of the EDP system 20 described herein greatly simplifies the typical design challenges associated with the control of objects requiring extraordinarily large forces to accelerate/decelerate objects with such large inertial mass.

Continuing now with our description of the transport system 10, in FIG. 6, an abutment member 34 is attached to each ferromagnetic element 26, i.e., to a surface facing a respective elongate slot 16. Each abutment member 34 includes a T-shaped staff or flag 36 which extends though the elongate slot 16 and defines a drive surface 38D on one side thereof and a registration surface 38R on its opposing side. The drive surface and registration surfaces 38D, 38R are generally orthogonal to the support deck 14 and are operative to engage an edge of the sheet material 12. The function of each of the surfaces 38D, 38R will be discussed in greater detail below, though, at this juncture in our discussion, it is suffice to say that the drive surface and registration surfaces 38D, 38R are operative to transport the sheet material along the feed path FP and/or align the edges of a collation of sheet material 12.

Figure 7:
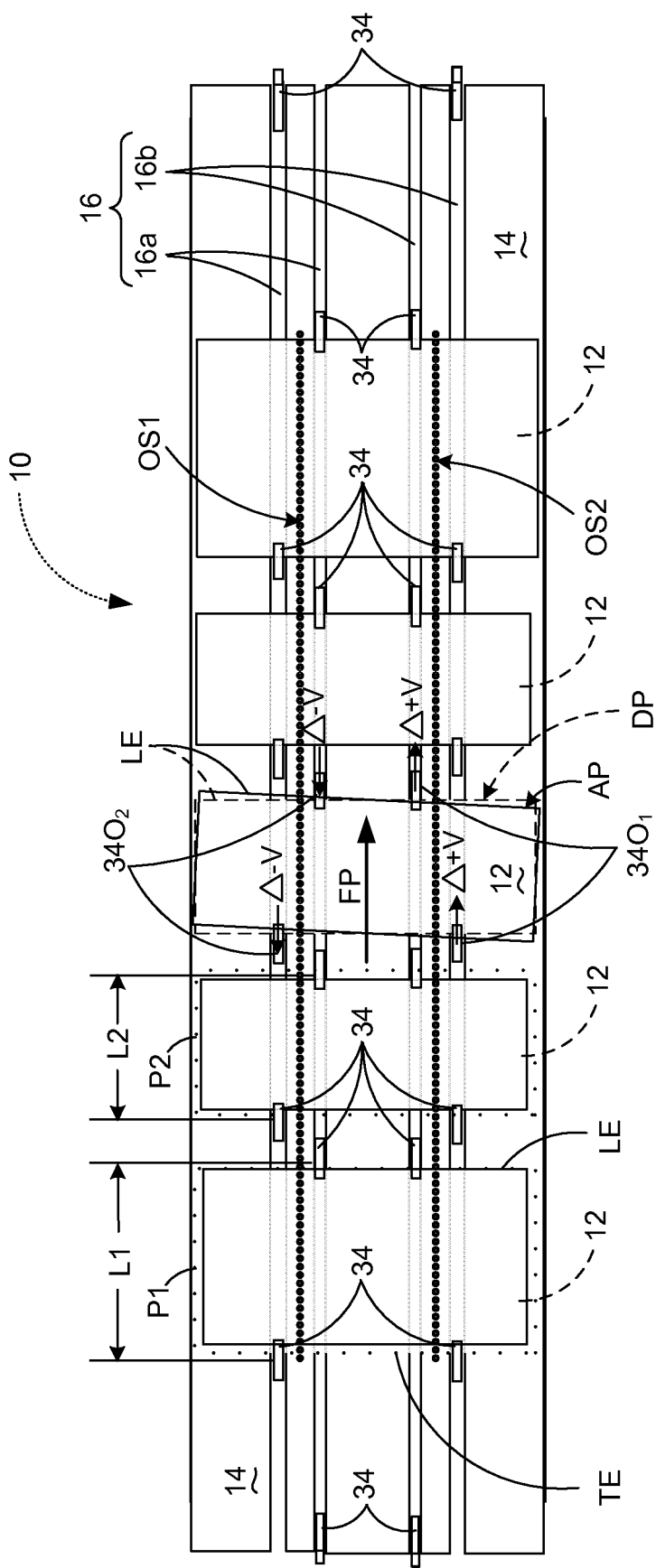
FIG. 7 depicts an alternate embodiment of the invention illustrating the use of the EDP system to correct misalignment of sheet material as it travels along the support deck.

In operation and referring to FIGS. 6 and 7, the processor 30 controls the EDP system 20 such that magnetic fields developed by the coils 28a, 28b of the guideway 24 produce forces operative to the ferromagnetic elements 26. While the ferromagnetic elements 26 may slide along the guideway channel 24C, e.g., top and bottom sidewalls thereof, the ferromagnetic elements 26 may be levitated by the suspension coil 28b to reduce or eliminate friction. As the ferromagnetic elements 26 move, the drive surfaces 38D of the abutment members 34 engage a trailing edge of the sheet material/stacked collation 12 for transport along the feed path FP.

The ferromagnetic elements 26 and associated abutment members 34 may be controlled and positioned to define rectangular pockets for retaining sheet material therebetween. In the described embodiment, four (4) abutment members 34 are employed to define the sheet material pocket, i.e., two (2) abutment members 34 positioned along the trailing edge TE and two (2) members 34 located along the opposing leading edge LE. While creating a transport pocket may be useful for retaining and transporting a single sheet of material 12, its principal use relates to registering the sheets of a stacked collation. With respect to this operating mode, the processor 30 first controls the EDP system 20 such that the spacing between the drive and registration surfaces 38D, 38R is enlarged or larger than the length dimension L1 of the sheet material to be laid therebetween. As sheet material 12 is added to build a stacked collation, the registration surfaces 38R may be bi-directionally oscillated, i.e., in the direction of arrow JS (see FIG. 6), to jog the edges of the sheet material 12. It should be noted that the bi-directional oscillation of a pair of abutment members 34 can occur while the stacked collation is transported by the drive surfaces 38D of an opposing pair of abutment members 34.

In another embodiment of the invention, the processor 30 may control the EDP system 20 such that THE relative position of a first pair of opposing abutment members $34O_1$ are moved, forward or aft, relative to a second pair of opposing abutment members $34O_2$. While in the described embodiment, the opposing pairs $34O_1$, $34O_2$ are each in different guideway channels 24C, it should be appreciated that they may be located in the same guideway channel 24C. Should the sheet material/stacked collation 12 become misaligned, the processor 30 may control the EDP system 20 to incrementally increase the velocity of the first pair of abutment members $34O_1$ (denoted by the delta $\Delta+V$ symbol in FIG. 7) while incrementally decreasing the velocity of the second pair of abutment members $34O_2$ (denoted by the delta $\Delta-V$ symbol in FIG. 7). By increasing or decreasing the velocity of the first or second pairs of abutment members $34O_1$, $34O_2$, the sheet material/stacked collation 12 may be rotated and brought back into the proper transport alignment, i.e., the desired angular position.

While misalignment of the sheet material or stacked collation 12 may be detected using a variety of sensing devices, the described embodiment depicts two (2) rows or arrays of laterally-spaced optical sensors OS1, OS2. The optical sensors OS1, OS2 sense an actual angular position AP of an edge LE of the sheet material 12, and issue an orientation signal indicative thereof. The processor (not shown in FIG. 7) stores prescribed position data indicative of a desired angular position DP of the sheet material 12 and is responsive to the orientation signal for (i) comparing the actual angular position AP to the desired angular position DP, (ii) calculating a difference value therebetween, and (iii) issuing an error correction signal, based upon the difference value, to the vary the position of the ferromagnetic elements 26. As mentioned in the preceding paragraph, this may be performed by increasing or decreasing the velocity of the first and second pairs of abutment members 34O$_1$, 34O$_2$. As a consequence, the sheet material or stacked collation may be rotated or transposed to the desired angular position DP.

While a variety of sensing devices may be employed to detect the status/condition of the sheet material, e.g., a paper jam, paper location or angular orientation, another advantage of the EDP system 20 relates to feedback which can be obtained from the ferromagnetic elements 26 and the coils 28a, 28b. For example, should a jam occur, a sheet material collation 12 will retard the motion of at least one abutment member 34, i.e., the "pushing" member 34 along the trailing edge of the collation. The opposing abutment member 34, i.e., the "jogging" or "aligning" member 34 along the leading edge of the collation, on the other hand, may continue traveling forward, unabated. Inasmuch as each of the abutment members 34 is tied to a ferromagnetic element 26, the motion of each (whether the ferromagnetic elements 26 decelerate, stop, move apart or move together), will momentarily increase resistance or, alternatively induce a current spike in the adjacent coil. This fluctuation in current can then be sensed and interpreted by the controller for determining the correct or appropriate action. For example, the controller may provide a jam indication to an operator and/or momentarily pause the EDP system 20.

In another embodiment of the invention, the processor 30 may control the EDP system 20 such that relative spacing between pairs of abutment members 34, i.e., the longitudinal spacing, may be varied to increase or decrease the size of a transport pocket. For example, in FIG. 7, the abutment members 34 may be spaced to produce a first pocket P1 having a length which generally corresponds to the length dimension L1 of one stacked collation 12. Similarly, the abutment members 34 may be spaced to produce a second pocket P2, adjacent to or downstream of the first pocket P1, having a length dimension which corresponds to the length dimension L2 of another stacked collation. As such, the pocket size may be varied to increase the throughput of the transport system. That is, throughput is optimized by maximizing the number of collations which may be carried on the support deck 14.

In yet another embodiment of the invention, it may be desirable to shield the sheet material or mailpieces from the electromagnetic flux field produced by the EDP system 20. For example, certain mailpieces may contain security devices, credit cards, debit cards etc., having magnetic strips which may be influenced by the magnetic field produced by the EDP system 20. As such, it may be desirable to include a wire mesh, copper shielding, or other conductive material to diminish or eliminate the flux field surrounding the mailpiece.

In summary, the present invention provides a low-maintenance, reliable, and low-cost system for transporting sheet material. The EDP system 20 minimizes wear, erosion and maintenance by significantly reducing friction between moving components. Furthermore, the EDP system requires no chains, belts, or mechanical drive systems which require lubrication, periodic inspection, and maintenance repair/replacement. The transport system of the present invention is highly reliable and requires a minimal number of spare or replacement parts. Accordingly, low spare part inventories can be maintained further reducing overhead costs.

Additionally, and perhaps more importantly, the transport system of the present invention is highly flexible, enabling a variety of previously unavailable controller functions. The transport system 20 of the present invention facilitates the initial set-up and dimension requirements for the travel pocket. Simple control inputs can be made by the processor 30 to establish the initial spacing between the ferromagnetic elements 26 and, accordingly, the abutment members 34. In contrast, the prior art transport and alignment systems typically rely upon laborious/painstaking adjustments of various components e.g., the push fingers and stop mechanisms to establish the pocket size.

The transport system provides for a variable pocket size which maximizes throughput by enabling a higher percentage of the useable transport deck. The transport system also provides for nearly infinite adjustment of the pocket size. Whereas, in the prior art, finite or incremental adjustment of the pocket size is made possible through manual adjustment, the present invention enables fine differential adjustments of the position and/or speed of the ferromagnetic elements 26 for virtually infinite adjustment of the abutment members 34 and, consequently, the pocket size. Furthermore, such adjustments can be made through software control logic rather than through changes to transmission gearing as is typically required in prior art sheet material handling/transport systems.

Furthermore, the transport system of the present invention allows for registration of sheet material, i.e., by the bi-directional oscillation of abutment members 34. Inasmuch as registration can occur at the same time as the stacked collation travels along the support deck, throughput efficiency is increased. Finally, the transport system provides for alignment of sheet material/stacked collations as it travels along the support deck. The transport system avoids the requirement to off-load misaligned/poorly aligned sheet material. Once again, throughput efficiency is increased.

While the transport and alignment system has been described in the context chassis module of a mailpiece inserter system, it will be appreciated that the transport and alignment system is applicable to any sheet material handling system. Furthermore, while adjacent pairs of EDP systems and abutment flags are shown, a single EDP system and abutment device for engaging the sheet material may be employed.

It is to be understood that the present invention is not to be considered as limited to the specific embodiments described above and shown in the accompanying drawings. The illustrations merely show the best mode presently contemplated for carrying out the invention, and which is susceptible to such changes as may be obvious to one skilled in the art. The invention is intended to cover all such variations, modifications and equivalents thereof as may be deemed to be within the scope of the claims appended hereto.

The invention claimed is:

1. A transport system for conveying sheet material along a feed path, comprising:

a support deck defining the feed path and having an elongate opening formed therein;

an electro-dynamic propulsion system having at least one guideway and at least one ferromagnetic element disposed within the guideway, the guideway including a magnetic coil operative to produce a variable magnetic field, the magnetic field having a variable flux density and polarity for propelling the ferromagnetic element within the guideway;

an abutment member coupled to the ferromagnetic element, extending through the elongate opening of the support deck and engaging an edge of sheet material;

an array of sensors disposed along the feed path operative to sense an actual angular position of an edge of the sheet material, and issuing an orientation signal indicative thereof, and a processor operative to control the magnetic field of the electro-dynamic propulsion system thereby propelling the ferromagnetic element within the guideway to transport the sheet material along the feed path, the processor storing prescribed position data indicative of a desired angular position of the sheet material, and responsive to the orientation signal for (i) comparing the actual angular position to the desired angular position, (ii) calculating a difference value therebetween, and (iii) issuing an error correction signal, based upon the difference value, to the vary the position of the ferromagnetic elements thereby transposing the sheet material to the desired angular position.

2. The transport system according to claim 1 wherein the electro-dynamic propulsion system includes a plurality of longitudinally spaced ferromagnetic elements disposed in each guideway, the ferromagnetic elements defining pockets for accepting and producing a stacked collation of sheet material therebetween.

3. The transport system according to claim 2 wherein at least one of the stacked collations has a length dimension which differs from the length dimension of another stacked collation; and, wherein the processor controls the spatial position of the ferromagnetic elements to vary the pocket dimension thereby accommodating collations of varying length dimension.

4. The transport system according to claim 1 wherein the support deck defines first and second elongate opening;

wherein the electro-dynamic propulsion system includes first and second guideways each having a plurality of ferromagnetic elements disposed therein;

wherein an abutment member associated with one ferromagnetic element includes a drive surface and wherein an abutment member associated with another ferromagnetic element includes a registration surface; and, wherein the processor controls the relative motion of the ferromagnetic elements such that the drive surface of one abutment member engages one edge of the sheet material to transport the sheet material and the registration surface of another ferromagnetic element engages an opposing edge of the sheet material to maintain the relative position of the sheets traveling along the feed path.

5. The transport system according to claim 4 wherein the processor oscillates pairs of ferromagnetic elements to jog the registration surfaces against the edges of the sheet material thereby aligning sheets of a stacked collation.

6. The transport according to claim 1 wherein the magnetic coil includes a propulsion coil for propelling each ferromagnetic element and a suspension coil for levitating each ferromagnetic element within a guideway channel.

7. The transport system according to claim 1 wherein the ferromagnetic elements are operative to induce a current in the magnetic coil and wherein the processor is responsive to the induced current for determining a condition of the sheet material.

* * * * *